United States Patent
Cope et al.

(10) Patent No.: US 12,184,650 B2
(45) Date of Patent: Dec. 31, 2024

(54) SCALABLE AND SECURE EDGE CLUSTER REGISTRATION

(71) Applicant: RED HAT, INC., Raleigh, NC (US)

(72) Inventors: Jonathan Hal Cope, Leander, TX (US); Huamin Chen, Westford, MA (US); Ricardo Noriega De Soto, Madrid (ES); Frank Alexander Zdarsky, Karlsruhe (DE)

(73) Assignee: Red Hat, Inc., Raleigh, NC (US)

( * ) Notice: Subject to any disclaimer, the term of this patent is extended or adjusted under 35 U.S.C. 154(b) by 289 days.

(21) Appl. No.: 17/526,777

(22) Filed: Nov. 15, 2021

(65) Prior Publication Data

US 2023/0156004 A1   May 18, 2023

(51) Int. Cl.
| | |
|---|---|
| H04L 9/40 | (2022.01) |
| G06F 9/455 | (2018.01) |
| H04L 61/2596 | (2022.01) |
| H04L 67/141 | (2022.01) |
| H04L 67/56 | (2022.01) |

(52) U.S. Cl.
CPC ...... H04L 63/0884 (2013.01); H04L 61/2596 (2013.01); H04L 67/141 (2013.01); H04L 67/56 (2022.05); *G06F 9/45533* (2013.01)

(58) Field of Classification Search
CPC ... H04L 63/0884; H04L 67/56; H04L 67/141; H04L 61/2596
See application file for complete search history.

(56) References Cited

U.S. PATENT DOCUMENTS

| | | | |
|---|---|---|---|
| 7,970,916 B2 | 6/2011 | Shanmugham | |
| 10,116,568 B2 | 10/2018 | Zhang et al. | |
| 10,212,282 B2 | 2/2019 | Kamboh et al. | |
| 10,237,252 B2 * | 3/2019 | Nandyala | H04L 63/08 |
| 10,693,860 B2 | 6/2020 | Suresh | |
| 11,329,882 B2 * | 5/2022 | Christober | H04L 41/0816 |
| 11,729,615 B2 * | 8/2023 | Zhou | H04L 63/0884 |
| | | | 726/7 |

(Continued)

FOREIGN PATENT DOCUMENTS

| | | | | |
|---|---|---|---|---|
| CA | 2999775 A1 | 7/2017 | | |
| CN | 111901285 A | * 11/2020 | | H04L 63/08 |

OTHER PUBLICATIONS

"Edge Multi-Cluster Orchestrator (EMCO)" (2020). pages 28.
Pavlik, J. (Dec. 18, 2019). "Managing Thousands of Edge Kubernetes Clusters with GitOps," pp. 11.

*Primary Examiner* — Madhuri R Herzog
(74) *Attorney, Agent, or Firm* — Womble Bond Dickinson (US) LLP

(57) ABSTRACT

A method includes initiating, by a device manager associated with a cluster manager proxy, a connection with a cluster of computing devices, wherein initiating the connection includes providing first credentials to the cluster of computing devices to access the cluster manager proxy. The method further includes receiving, at the cluster manager proxy, a first request to register the cluster of computing devices with a cluster manager, the first request including the first credentials to access the cluster manager proxy and sending, from the cluster manager proxy to the cluster manager, a second request to register the cluster of computing devices with the cluster manager, the second request including second credentials to access the cluster manager.

20 Claims, 6 Drawing Sheets

(56) References Cited

U.S. PATENT DOCUMENTS

| | | |
|---|---|---|
| 2018/0131770 A1* | 5/2018 | Doraiswamy ........... H04L 67/10 |
| 2019/0141119 A1* | 5/2019 | Bernat ................ H04L 67/1023 |
| 2022/0046021 A1* | 2/2022 | McCready .............. H04L 63/08 |

* cited by examiner

SCALABLE AND SECURE EDGE CLUSTER REGISTRATION

TECHNICAL FIELD

Aspects of the present disclosure relate to edge cluster management, and more particularly, to a scalable and secure process for edge cluster registration.

BACKGROUND

Edge computing is computing that takes place at or near the physical location of either the user or the source of the data. Placing computing services closer to these locations results in faster, more reliable services while also providing for the flexibility of cloud computing. Edge computing can utilize geographically distributed clusters of devices (e.g., edge clusters) that are monitored and managed by one or more centralized cluster management systems.

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments by one skilled in the art without departing from the spirit and scope of the described embodiments.

DETAILED DESCRIPTION

Figure 1:
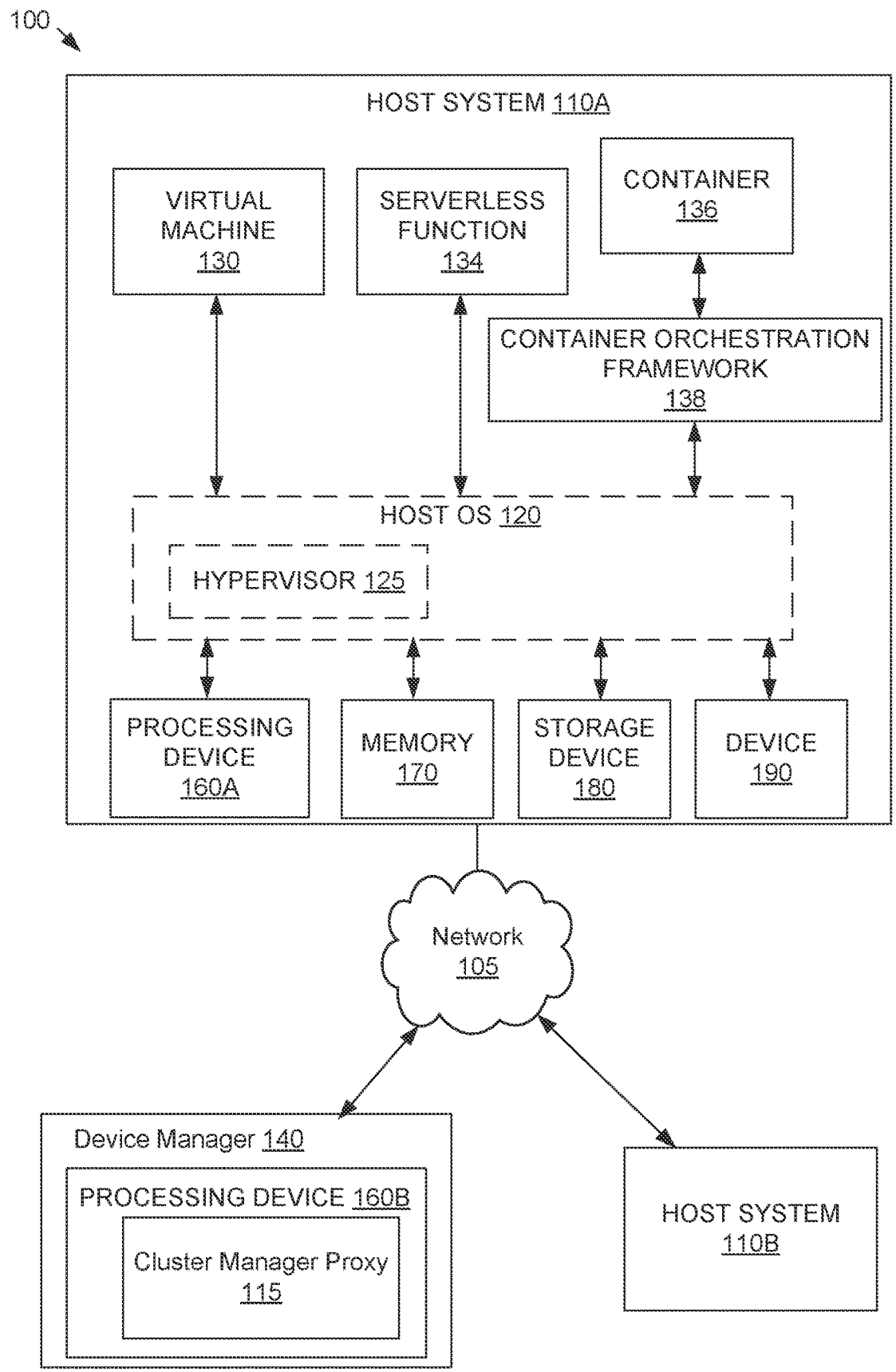
FIG. 1 is a system diagram that illustrates an example system for edge cluster registration and management, in accordance with some embodiments.

Edge computing is computing that takes place at or near the physical location of either the user or the source of the data. Placing computing services closer to these locations results in faster, more reliable services while also providing for the flexibility of cloud computing. With the advent of 5G technologies, edge computing is supporting a larger scale of cloud native edge clusters. These edge clusters may be monitored and managed by a cluster management system (e.g., Open Cluster Management™, Red Hat Advanced Cluster Management™, etc.). The cluster management system may therefore manage large numbers of credentials and communications with the large numbers of clusters. Additionally, separate device managers may bootstrap and initiate computing devices of edge clusters to be managed by the cluster management system. Each device manager may bootstrap a subset of all the clusters managed by the cluster management system. For example, a device manager may bootstrap devices of clusters in a particular geographic area near the device manager. Once bootstrapped, the clusters may register with the cluster management system which may provide workloads to be executed by registered clusters.

In conventional systems, registering an edge cluster to a cluster management system is performed in several manual steps including generating and exposing credentials (e.g., certificates) to the edge clusters. However, generating and exposing credentials of the cluster management system to a large number of edge clusters is neither automated nor secure and could result in the credentials being misused or compromised. Additionally, managing a large number of clusters (e.g., thousands of edge clusters) each with its own credentials is inefficient and costly. For example, generation of the credentials uses a large amount of compute power and storing of the credentials creates large storage overhead. Furthermore, because device management (e.g., bootstrapping and ignition) and cluster management are performed by different components (i.e., device manager and cluster management system) certain issues or conflicts may arise. For example, because they work independently, the device managers and cluster management system do not atomically and automatically register and bootstrap edge clusters. Therefore, the cluster management system may be unaware if an edge cluster has been properly bootstrapped and/or sanitized.

Aspects of the disclosure address the above-noted and other deficiencies by providing a device manager and a cluster manager proxy to act as an intermediary between a cluster management system for cluster registration as well as cluster monitoring and management. The proxy may obtain and store credentials for the cluster management system so that the proxy can communicate with the cluster management system. The proxy may further generate its own certificates (e.g., proxy credentials) for each cluster that is bootstrapped by the device manager. For example, upon providing bootstrapping binaries to a cluster, the proxy may generate credentials and provide the credentials to the cluster being bootstrapped. Thus, the cluster may be able to communicate with the proxy using the provided proxy credentials. Once bootstrapped, each cluster may register itself with the proxy using the proxy's certificate by sending a registration request to the proxy. The proxy may then forward the request to the cluster management system using the stored credentials for the cluster management system. The request may include information about the cluster to be provided to the cluster management system to allow the cluster management system to allocate and manage workloads.

In one example, the proxy may use the same API as the cluster management system such that the clusters are unaware they are communicating with a proxy. It may appear to the clusters that they are communicating directly with the cluster management system. The proxy may forward the registration request to the cluster management system after verifying that the cluster has been bootstrapped by the device manager and proxy. The cluster management system may verify the credentials received with the request (e.g., the cluster management system credentials stored by the device manager and proxy), register the cluster, and store the information associated with the cluster. Accordingly, the credentials of the cluster management system are only provided to the device manager and cluster manager proxy, rather than each of the clusters managed by the cluster management system. Additionally, the credentials provided to the proxy (e.g., certificate) may be provided limited privileges for accessing resources of the cluster management system. For example, the credentials may allow the proxy to create essential resources in the cluster management system and get the created resources on behalf of an edge cluster but may not be allowed to list the resources.

Because edge clusters are only provided with access to the proxy (via the proxy credentials) and the proxy is provided limited access for listing resources managed by the cluster management system, a compromised cluster may only damage the proxy and the edge clusters associated with the proxy, rather than the entire system. Additionally, because the cluster management system only manages the certificates for the proxies, rather than for each edge cluster, the number of certificates stored and managed by the cluster management system is significantly reduced. Furthermore, because the device manager first bootstraps and sanitizes the edge clusters, the cluster management proxy of the device manager can then confirm that a cluster requesting registration has been bootstrapped and sanitized before registering the cluster. For example, the cluster management proxy may confirm a fingerprint of the cluster or particular metrics of the cluster to verify that the cluster has been bootstrapped. Therefore, potential attacks by rogue cluster can be mitigated and overhead associated with managing and storing cluster credentials can be minimized.

FIG. 1 depicts a high-level component diagram of an illustrative example of a computer system architecture 100, in accordance with one or more aspects of the present disclosure. One skilled in the art will appreciate that other computer system architectures are possible, and that the implementation of a computer system utilizing examples of the invention are not necessarily limited to the specific architecture depicted by FIG. 1.

As shown in FIG. 1, computer system architecture 100 includes host systems 110A-B and device manager 140. The host systems 110A-B and device manager 140 include one or more processing devices 160A-B, memory 170, which may include volatile memory devices (e.g., random access memory (RAM)), non-volatile memory devices (e.g., flash memory) and/or other types of memory devices, a storage device 180 (e.g., one or more magnetic hard disk drives, a Peripheral Component Interconnect [PCI] solid state drive, a Redundant Array of Independent Disks [RAID] system, a network attached storage [NAS] array, etc.), and one or more devices 190 (e.g., a Peripheral Component Interconnect [PCI] device, network interface controller (NIC), a video card, an I/O device, etc.). In certain implementations, memory 170 may be non-uniform access (NUMA), such that memory access time depends on the memory location relative to processing devices 160A-B. It should be noted that although, for simplicity, host system 110A is depicted as including a single processing device 160A, storage device 180, and device 190 in FIG. 1, other embodiments of host systems 110A may include a plurality of processing devices, storage devices, and devices. Similarly, cloud environment 140 and host system 110B may include a plurality of processing devices, storage devices, and devices. The host systems 110A-B and device manager 140 may each be a server, a mainframe, a workstation, a personal computer (PC), a mobile phone, a palm-sized computing device, etc. In embodiments, host systems 110A-B and device manager 140 may be separate computing devices. In some embodiments, host systems 110A-B and/or device manager 140 may be implemented by a single computing device. For clarity, some components of device manager 140 and host system 110B are not shown. Furthermore, although computer system architecture 100 is illustrated as having two host systems, embodiments of the disclosure may utilize any number of host systems.

Host system 110A may additionally include one or more virtual machines (VMs) 130, serverless functions 134, containers 136, container orchestration framework 138 and host operating system (OS) 120. VM 130 is a software implementation of a machine that executes programs as though it were an actual physical machine. Serverless function 134 may be a self-contained function that performs a particular task, service, etc. Serverless functions 134 can be instantiated and scaled as necessary to process dynamic workloads. Container 136 acts as an isolated execution environment for different functions of applications. The VM 130 and/or container 136 may be an instance of a serverless application or function for executing one or more applications of a serverless framework. In some examples, serverless function 134 can be executed within VM 130 and/or container 136. Host OS 120 manages the hardware resources of the computer system and provides functions such as inter-process communication, scheduling, memory management, and so forth.

Host OS 120 may, optionally, include a hypervisor 125 (which may also be known as a virtual machine monitor (VMM)), which provides a virtual operating platform for VMs 130 and manages their execution. Hypervisor 125 may manage system resources, including access to physical processing devices (e.g., processors, CPUs, etc.), physical memory (e.g., RAM), storage device (e.g., HDDs, SSDs), and/or other devices (e.g., sound cards, video cards, etc.). The hypervisor 125, though typically implemented in software, may emulate and export a bare machine interface to higher level software in the form of virtual processors and guest memory. Higher level software may comprise a standard or real-time OS, may be a highly stripped down operating environment with limited operating system functionality, and/or may not include traditional OS facilities, etc. Hypervisor 125 may present other software (i.e., "guest" software) the abstraction of one or more VMs that provide the same or different abstractions to various guest software (e.g., guest operating system, guest applications). It should be noted that in some alternative implementations, hypervisor 125 may be external to host OS 120, rather than embedded within host OS 120, or may replace host OS 120. Host system 110A may also include a container orchestration framework 138 (e.g., Kubernetes) to manage containers 136. For example, container orchestration framework 138 may manage instantiating, scaling, networking, etc. of containers 136. In some examples, container orchestration framework 138 and container 136 may execute on the host OS 120 while VMs 130 are executed by hypervisor 125.

The host systems 110A-B and device manager 140 may be coupled (e.g., may be operatively coupled, communicatively coupled, may communicate data/messages with each other) via network 105. Network 105 may be a public network (e.g., the internet), a private network (e.g., a local area network (LAN) or wide area network (WAN)), or a combination thereof. In one embodiment, network 105 may include a wired or a wireless infrastructure, which may be provided by one or more wireless communications systems, such as a WiFi™ hotspot connected with the network 105 and/or a wireless carrier system that can be implemented using various data processing equipment, communication towers (e.g., cell towers), etc. The network 105 may carry communications (e.g., data, message, packets, frames, etc.) between the various components of host systems 110A-B and/or device manager 140. In some embodiments, host system 110A and 110B may be a part of device manager 140. For example, the virtual machines 130 and/or containers 136 of host system 110A and 110B may be a part of a virtual network of the device manager 140.

In embodiments, processing device 160B of the device manager 140 may execute a cluster management proxy 115. In some embodiments, the cluster management proxy 115 may operate as an intermediary between one or more edge clusters and a cluster management system. The cluster management proxy 115 may register itself with the cluster management system and obtain credentials for accessing and/or creating resources with the cluster management system (e.g., adding a cluster to system). The cluster management proxy 115 may register edge clusters with the cluster management system. For example, the device manager 140 and/or cluster management proxy 115 may bootstrap a new cluster (e.g., by providing bootstrap binaries to a cluster) and generate credentials for the cluster to access and communicate with the cluster management proxy 115. The cluster management proxy 115 may receive a request from a bootstrapped cluster to register the cluster with the cluster management system along with credentials for the cluster management proxy 115 and information about the cluster. The cluster management proxy 115 may then send the request to the cluster management system on behalf of the cluster (e.g., rather than the cluster sending the registration request directly). The cluster management proxy 115 may provide the registration request with the credentials for accessing the cluster management system. The cluster management system can then register the cluster with the provided information and create the appropriate resources. The cluster management system may then monitor and manage the cluster through the cluster management proxy 115. For example, the cluster management system may send workload instructions for the cluster to the cluster management proxy 115 which may then forward the instructions to the cluster. Further details regarding the cluster management proxy 115 will be discussed at FIGS. 2-5 below.

Figure 2:
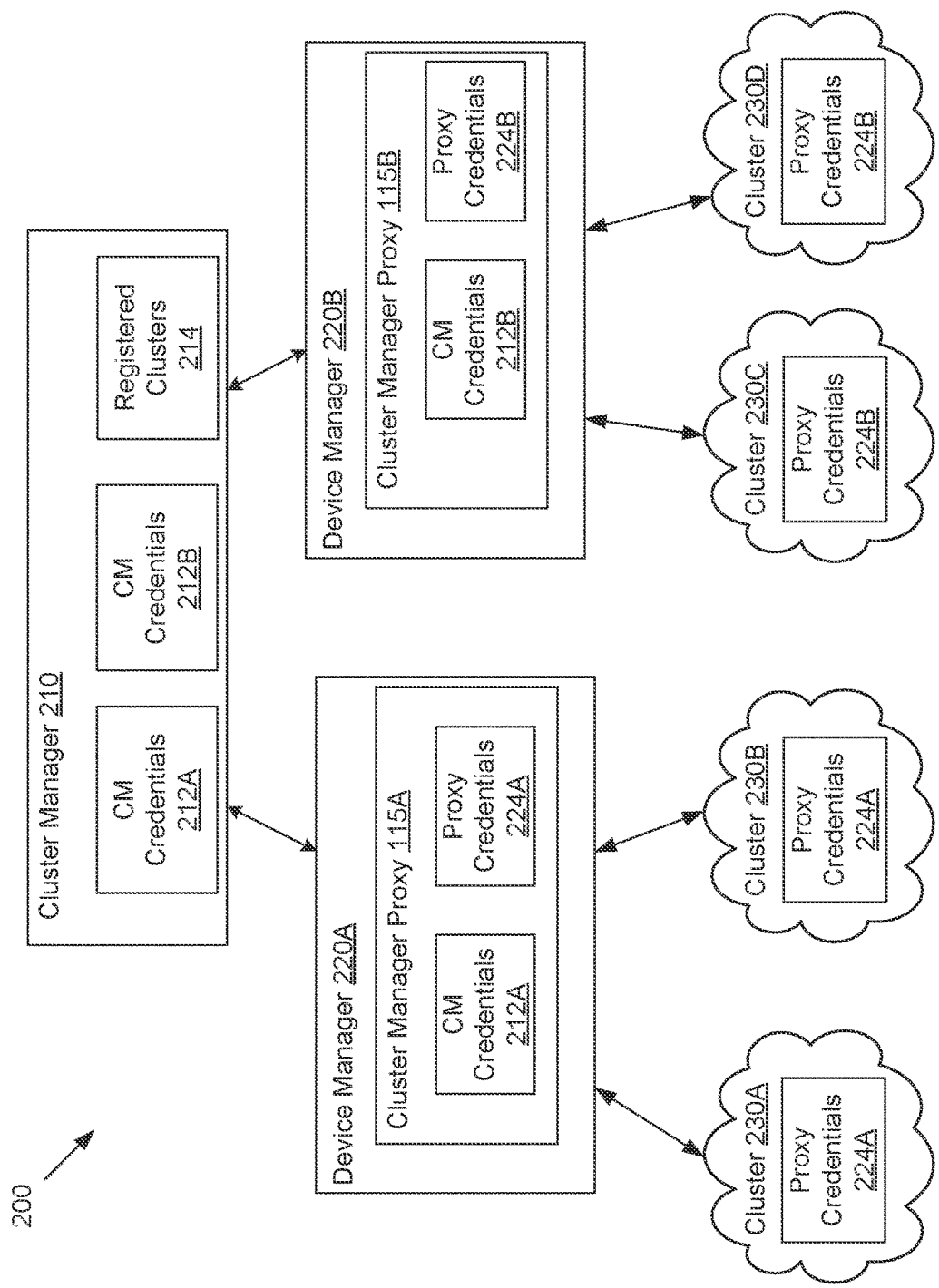
FIG. 2 is a system diagram that illustrates another example of a system for edge cluster registration and management in accordance with embodiments of the disclosure.

FIG. 2 is a block diagram that illustrates a system 200 for edge cluster registration and management, according to some embodiments. The system 200 includes a cluster manager 210, one or more device managers 220A-B, and one or more computing device clusters 230A-D. The cluster manager 210 may be a cluster management system, also referred to as a cluster fleet manager, such as Open Cluster Management™, Red Hat Advanced Cluster Management™ (RHACM), etc. The cluster manager 210 may monitor and manage operation of resources of several edge clusters of the system. In some examples, the cluster manager 210 may oversee operation of all the resources of the system 200. The cluster manager 210 may keep a list, or other data structure, of registered clusters 214 and other resources of the system 200 that can be used to execute computing workloads. As described in more detail below, the cluster manager 210 may also generate and store cluster manager (CM) credentials (e.g., CM credentials 212A-B) for providing one or more cluster manager proxies at a device manager with access to the cluster manager 210 to create and register resources with the cluster manager 210.

In some examples, the system 200 may include one or more device managers 220A-B for bootstrapping and ignition of edge cluster devices. For example, each device manager 220A-B may provide bootstrap binaries to new edge clusters to provide the proper operating system for devices of the cluster to communicate with the device managers 220A-B and, in turn, the cluster manager 210. Device managers 220A-B may each include a cluster manager proxy 222A-B, respectively, to act as an intermediary between the clusters managed by the device managers 220A-B and the cluster manager 210. The cluster manager proxies 222A-B may generate and provide credentials (e.g., proxy credentials 224A-B) to the clusters to provide the clusters with access to the cluster manager proxy 222A-B. For example, as depicted in FIG. 2, cluster manager proxy 222A of device manager 220A may generate proxy credentials 224A to clusters 230A and 230B upon bootstrapping of the clusters 230A-B. When communicating with the cluster manager proxy 222A, the clusters 230A-B may include proxy credentials 224A to authenticate the cluster with the cluster manager proxy 222A.

In some examples, after a cluster has been bootstrapped and initiated, it may send a request to the cluster manager proxy to register the cluster with the cluster manager. For example, cluster 230A may send a registration request to the cluster manager proxy 222A along with proxy credentials 224A. The cluster manager proxy 222A may then verify the proxy credentials associated with the request against its own records for the proxy credentials 224A for each of the clusters. The cluster manager proxy 222A may also confirm that the cluster 230A has been bootstrapped by the device manager 220A by comparing a fingerprint or metrics of the cluster 230A to a fingerprint or metrics collected for the cluster 230A during bootstrapping.

Once validated that the cluster 230A is a bootstrapped cluster and not a rogue cluster, the cluster manager proxy 222A may send the registration request to the cluster manager 210 with CM credentials 212A which the cluster manager proxy 222A stores for accessing the cluster manager 210. The cluster manager 210 may validate that the CM credentials 212A match its own records for the CM credentials 212A. Once validated, the cluster manager 210 may register the cluster 230A and add the cluster, along with information associated with the cluster to a list of registered clusters 214 of the cluster manager 210. In some examples, the cluster manager 210 generates a namespace for the device manager 220A and adds sub-directories to the namespace for each of the clusters 230A-B registered through the device manager 220A. The cluster manager 210 may then provide workload instructions to the cluster 230A, via the cluster manager proxy 222A, after the cluster has been registered. Accordingly, the clusters 230A-D do not have direct access to the cluster manager 210 and rather communicate with the cluster manager 210 through the cluster manager proxies 222A-B. Therefore, malicious or rogue clusters (e.g., using compromised proxy credentials 224) cannot access the entire system 200 and any attacks are limited to the clusters within the domain of the device manager being attacked.

In some examples, the clusters 230A-D each communicate with the cluster manager proxies 222A-B using the same API used by the cluster manager 210. Therefore, it may appear to the clusters 230A-D that they are communicating directly with the cluster manager 210 while in fact the clusters 230A-D are communicating with the cluster manager proxies 220A-B. It should be noted that although FIG. 2 depicts two device managers and cluster manager proxies, the system may include any number of device managers and cluster manager proxies. Additionally, although FIG. 2 depicts only two clusters being managed by each device manager and cluster manager proxy, any number of clusters may be associated with and managed by a device manager and cluster manager proxy.

Figure 3:
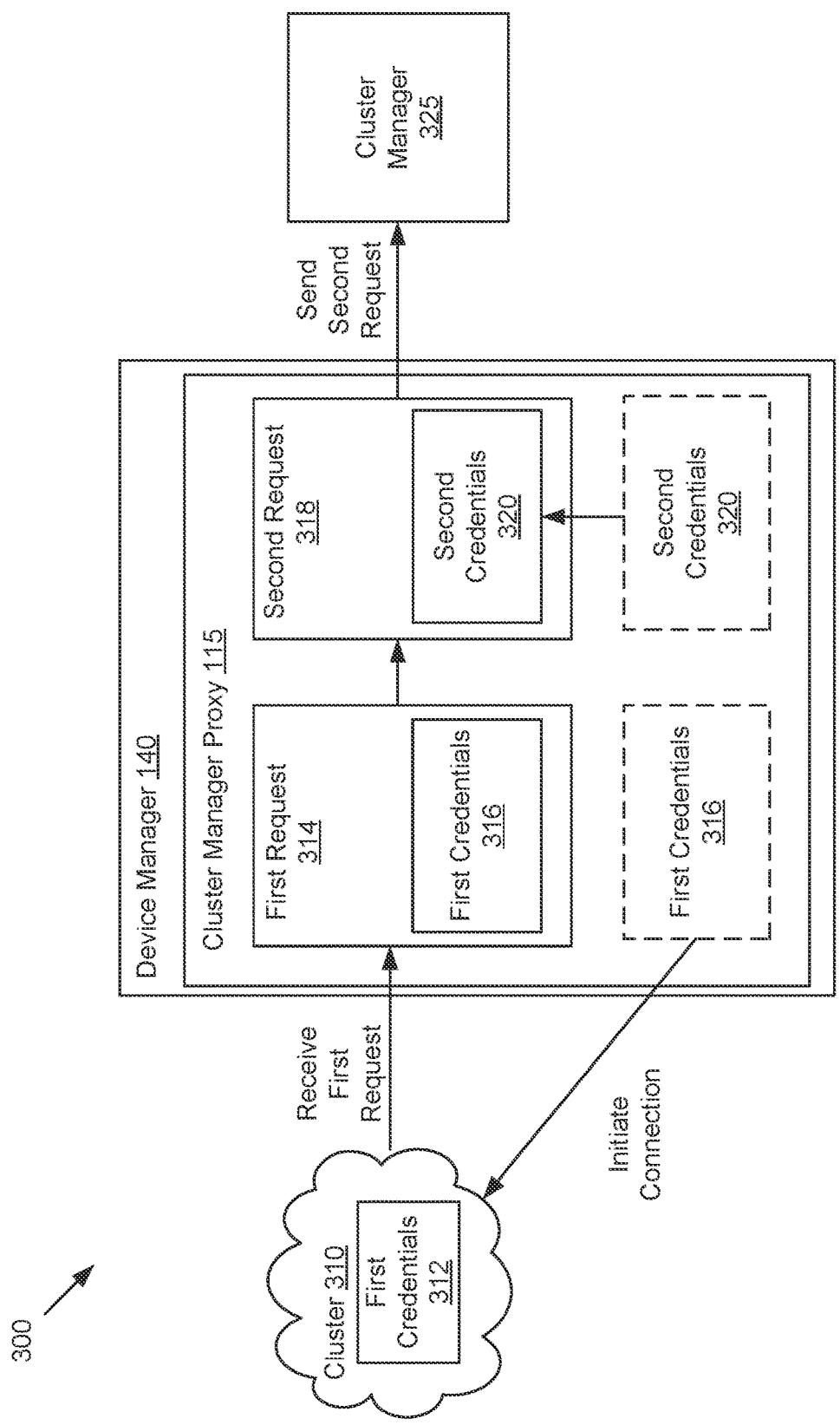
FIG. 3 is a block diagram that illustrates an example of a computer system for edge cluster registration and management in accordance with embodiments of the disclosure.

FIG. 3 is a block diagram that illustrates a computing system 300 for cluster registration, according to some embodiments. Computer system 300 may include a device manager 140 including a cluster manager proxy 115. The device manager 140 and cluster manager proxy 115 may be communicatively coupled to a cluster 310 of computing device and a cluster manager 325. The cluster 310 may include one or more edge clusters for executing workloads managed by the cluster manager 325. The cluster manager 325 may orchestrate execution of workloads to and between clusters registered with the cluster manager 325.

In the depicted example, the device manager 140 and cluster manager proxy 115 may initiate a connection with the cluster 310. The device manager 140 may provide first credentials 312 when initiating the connection with the cluster 310. For example, the device manager 140 may provide bootstrapping operating system binaries to the cluster 310. The first credentials 312 may be provided along with the bootstrapping binaries or may be provided after the cluster 310 has finished initialization. The cluster 310 may then send, to the cluster manager proxy 115, a first request 314 to register the cluster 310 with the cluster manager 325. The first request 314 may include first credentials 316 that were provided to the cluster 310 upon bootstrapping and initialization. The first credentials may register the cluster 310 with the cluster manager proxy 115 to provide the cluster 310 with access to the cluster manager proxy 115. The cluster manager proxy 115 may store the first credentials 316 (e.g., in a database, list, or other data structure, of credentials for clusters bootstrapped by the cluster manager proxy 115.

In some examples, the cluster manager proxy 115 may verify the first credentials 316 of the first request 314 and generate a second request 318 to be provided from the cluster manager proxy 115 to the cluster manager 325. In one example, the cluster manager proxy 115 may generate the second request 318 by appending the second credentials 320 to the first request 314. The second credentials 320 may register the cluster manager proxy 115 with the cluster manager 325. Therefore, the cluster manager proxy 115 may forward the second request 318 to the cluster manager 325 along with the second credentials 320. The cluster manager 325 may verify the second credentials 320 and register the cluster 310. The cluster manager 325 may then be able to monitor and manage the cluster 310 through the cluster manager proxy 115. For example, the cluster manager 325 may provide workload instructions for the cluster 310 to the cluster manager proxy 115 which may then forward the instructions to the cluster 310.

Figure 4:
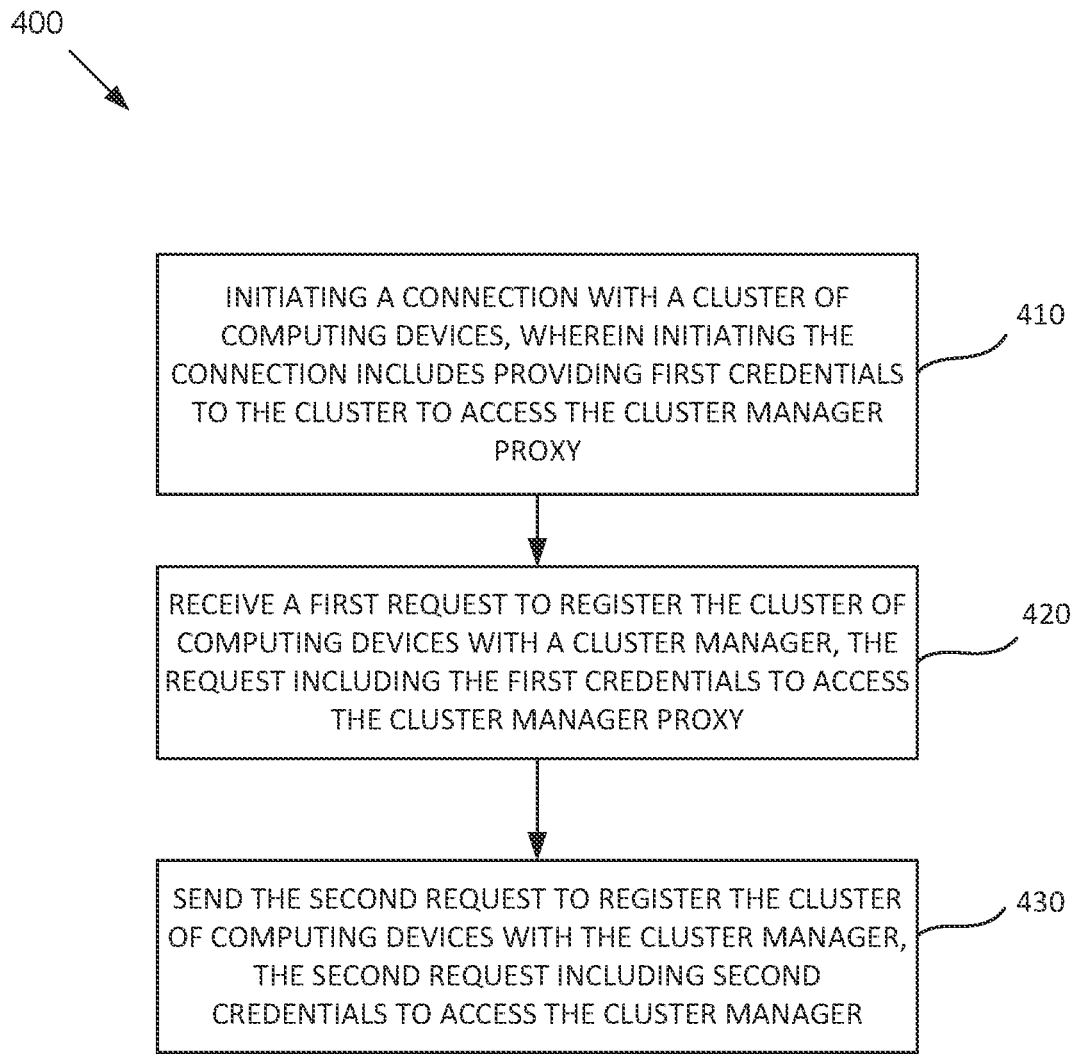
FIG. 4 is a flow diagram of a method of edge cluster registration, in accordance with some embodiments.

FIG. 4 is a flow diagram of a method 400 of edge cluster registration, in accordance with some embodiments. Method 400 may be performed by processing logic that may comprise hardware (e.g., circuitry, dedicated logic, programmable logic, a processor, a processing device, a central processing unit (CPU), a system-on-chip (SoC), etc.), software (e.g., instructions running/executing on a processing device), firmware (e.g., microcode), or a combination thereof. In some embodiments, at least a portion of method 400 may be performed by a cluster manager proxy 115 and/or device manager 140 of FIG. 1.

With reference to FIG. 4, method 400 illustrates example functions used by various embodiments. Although specific function blocks ("blocks") are disclosed in method 400, such blocks are examples. That is, embodiments are well suited to performing various other blocks or variations of the blocks recited in method 400. It is appreciated that the blocks in method 400 may be performed in an order different than presented, and that not all of the blocks in method 400 may be performed.

Method 400 begins at block 410, where the processing logic initiates a connection with a cluster of computing devices, wherein initiating the connection includes providing first credentials to the cluster to access the cluster manager proxy. To initiate the connection, the processing logic may bootstrap the devices of the cluster by providing bootstrapping binaries to be executed on the devices. In one example, the processing logic may generate credentials (e.g., a certificate) for the cluster to access the cluster manager proxy. The processing logic may provide the generated credentials to the cluster during or after bootstrapping of the devices of the cluster. In some examples, the cluster of computing devices is an edge computing cluster.

At block 420, the processing logic receives a first request to register the cluster of computing devices with a cluster manager. The request may include the first credentials to access the cluster manager proxy. The processing logic may verify the credentials provided with the first request. The processing logic may also verify that the cluster requesting to register with the cluster manager has previously been bootstrapped and/or sanitized by the device manager. For example, the processing logic may compare a fingerprint of the requesting cluster with one or more fingerprints of clusters that have been bootstrapped by the device manager. Accordingly, the processing logic may confirm that the cluster is a bootstrapped and verified cluster.

At block 430, the processing logic sends a second request to register the cluster of the computing devices with the cluster manager, the second request including second credentials to access the cluster manager. The cluster manager proxy may store the second credentials to be able to access the cluster manager. The second credentials may provide for communication between the cluster manager proxy and the cluster manager. In some examples, the first and second request may be the same command using via the same or similar API. Therefore, the second request may be the same as the first request but forwarded to the cluster manager with different credentials. The cluster manager may then register the cluster to be available to execute workloads managed by the cluster manager. The cluster manager may also provide instructions to the cluster, via the cluster manager proxy, indicating the resources (e.g., agents, applications, etc.) that the cluster should install to receive workload instructions from the cluster manager.

Figure 5:
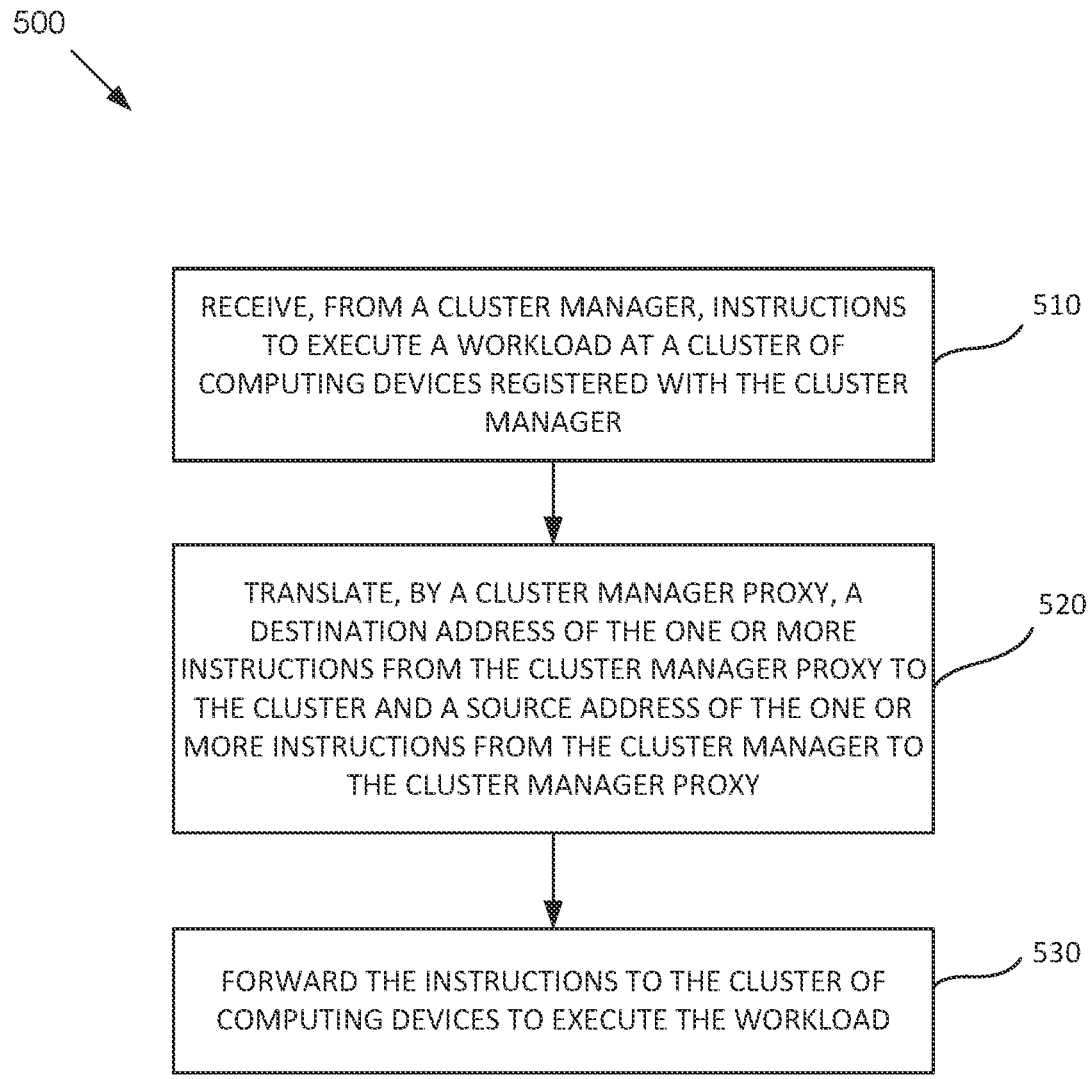
FIG. 5 is a flow diagram of an example method of edge cluster management, in accordance with some embodiments.

FIG. 5 is a flow diagram of a method 500 of edge cluster management, in accordance with some embodiments. Method 500 may be performed by processing logic that may comprise hardware (e.g., circuitry, dedicated logic, programmable logic, a processor, a processing device, a central processing unit (CPU), a system-on-chip (SoC), etc.), software (e.g., instructions running/executing on a processing device), firmware (e.g., microcode), or a combination thereof. In some embodiments, at least a portion of method 400 may be performed by a cluster manager proxy 115 and/or device manager 140 of FIG. 1.

With reference to FIG. 5, method 500 illustrates example functions used by various embodiments. Although specific function blocks ("blocks") are disclosed in method 500, such blocks are examples. That is, embodiments are well suited to performing various other blocks or variations of the blocks recited in method 500. It is appreciated that the blocks in method 500 may be performed in an order different than presented, and that not all of the blocks in method 500 may be performed.

Method 500 begins at block 510, where the processing logic receives, from a cluster manager, instructions to execute a workload at a cluster of computing devices registered with the cluster manager. In one example, the processing logic may first provide instructions to the cluster to start one or more applications (e.g., an agent) to receive workload instructions from the cluster manager. The cluster manager may then provide instructions to a cluster manager proxy for the cluster to execute a workload on the application.

At block 520, the processing logic translates a destination address of the one or more instructions from the device manager to the cluster and a source address of the one or more instructions from the cluster manager to the device manager. At block 530, the processing logic forwards the instructions to the cluster of computing devices to execute the workload. The cluster may be configured (e.g., via the same API as the cluster manager) to execute a workload when instructions are received from the proxy. Therefore, the cluster may perceive the instruction as being received directly from the cluster manager.

Figure 6:
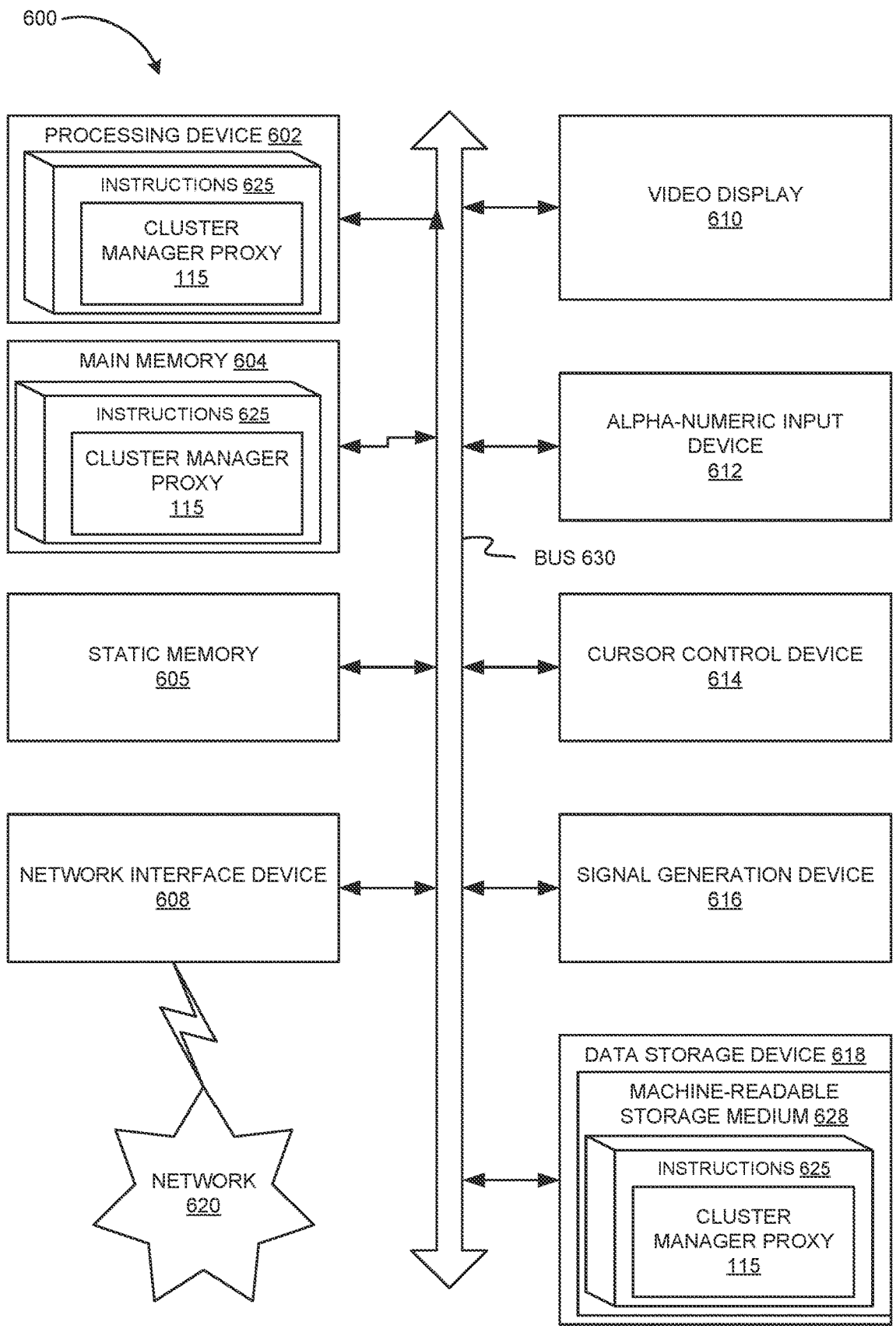
FIG. 6 is a block diagram of an example apparatus that may perform one or more of the operations described herein, in accordance with some embodiments of the present disclosure.

FIG. 6 is a block diagram of an example computing device 600 that may perform one or more of the operations described herein, in accordance with some embodiments. Computing device 600 may be connected to other computing devices in a LAN, an intranet, an extranet, and/or the Internet. The computing device may operate in the capacity of a server machine in client-server network environment or in the capacity of a client in a peer-to-peer network environment. The computing device may be provided by a personal computer (PC), a set-top box (STB), a server, a network router, switch or bridge, or any machine capable of executing a set of instructions (sequential or otherwise) that specify actions to be taken by that machine. Further, while only a single computing device is illustrated, the term "computing device" shall also be taken to include any collection of computing devices that individually or jointly execute a set (or multiple sets) of instructions to perform the methods discussed herein.

The example computing device 600 may include a processing device (e.g., a general purpose processor, a PLD, etc.) 602, a main memory 604 (e.g., synchronous dynamic random access memory (DRAM), read-only memory (ROM)), a static memory 606 (e.g., flash memory and a data storage device 618), which may communicate with each other via a bus 630.

Processing device 602 may be provided by one or more general-purpose processing devices such as a microprocessor, central processing unit, or the like. In an illustrative example, processing device 602 may comprise a complex instruction set computing (CISC) microprocessor, reduced instruction set computing (RISC) microprocessor, very long instruction word (VLIW) microprocessor, or a processor implementing other instruction sets or processors implementing a combination of instruction sets. Processing device 602 may also comprise one or more special-purpose processing devices such as an application specific integrated circuit (ASIC), a field programmable gate array (FPGA), a digital signal processor (DSP), network processor, or the like. The processing device 602 may be configured to execute the operations described herein, in accordance with one or more aspects of the present disclosure, for performing the operations and steps discussed herein.

Computing device 600 may further include a network interface device 608 which may communicate with a network 620. The computing device 600 also may include a video display unit 610 (e.g., a liquid crystal display (LCD) or a cathode ray tube (CRT)), an alphanumeric input device 612 (e.g., a keyboard), a cursor control device 614 (e.g., a mouse) and an acoustic signal generation device 616 (e.g., a speaker). In one embodiment, video display unit 610, alphanumeric input device 612, and cursor control device 614 may be combined into a single component or device (e.g., an LCD touch screen).

Data storage device 618 may include a computer-readable storage medium 628 on which may be stored one or more sets of instructions 625 that may include instructions for a cluster manager proxy, e.g., cluster manager proxy 115, for carrying out the operations described herein, in accordance with one or more aspects of the present disclosure. Instructions 625 may also reside, completely or at least partially, within main memory 604 and/or within processing device 602 during execution thereof by computing device 600, main memory 604 and processing device 602 also constituting computer-readable media. The instructions 625 may further be transmitted or received over a network 620 via network interface device 608.

While computer-readable storage medium 628 is shown in an illustrative example to be a single medium, the term "computer-readable storage medium" should be taken to include a single medium or multiple media (e.g., a centralized or distributed database and/or associated caches and servers) that store the one or more sets of instructions. The term "computer-readable storage medium" shall also be taken to include any medium that is capable of storing, encoding or carrying a set of instructions for execution by the machine and that cause the machine to perform the methods described herein. The term "computer-readable storage medium" shall accordingly be taken to include, but not be limited to, solid-state memories, optical media and magnetic media.

Unless specifically stated otherwise, terms such as "receiving," "routing," "updating," "providing," or the like, refer to actions and processes performed or implemented by computing devices that manipulates and transforms data represented as physical (electronic) quantities within the computing device's registers and memories into other data similarly represented as physical quantities within the computing device memories or registers or other such information storage, transmission or display devices. Also, the terms "first," "second," "third," "fourth," etc., as used herein are meant as labels to distinguish among different elements and may not necessarily have an ordinal meaning according to their numerical designation.

Examples described herein also relate to an apparatus for performing the operations described herein. This apparatus may be specially constructed for the required purposes, or it may comprise a general purpose computing device selectively programmed by a computer program stored in the computing device. Such a computer program may be stored in a computer-readable non-transitory storage medium.

The methods and illustrative examples described herein are not inherently related to any particular computer or other apparatus. Various general purpose systems may be used in accordance with the teachings described herein, or it may prove convenient to construct more specialized apparatus to perform the required method steps. The required structure for a variety of these systems will appear as set forth in the description above.

The above description is intended to be illustrative, and not restrictive. Although the present disclosure has been described with references to specific illustrative examples, it will be recognized that the present disclosure is not limited to the examples described. The scope of the disclosure should be determined with reference to the following claims, along with the full scope of equivalents to which the claims are entitled.

As used herein, the singular forms "a", "an" and "the" are intended to include the plural forms as well, unless the context clearly indicates otherwise. It will be further understood that the terms "comprises", "comprising", "includes", and/or "including", when used herein, specify the presence of stated features, integers, steps, operations, elements, and/or components, but do not preclude the presence or addition of one or more other features, integers, steps, operations, elements, components, and/or groups thereof. Therefore, the terminology used herein is for the purpose of describing particular embodiments only and is not intended to be limiting.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Although the method operations were described in a specific order, it should be understood that other operations may be performed in between described operations, described operations may be adjusted so that they occur at slightly different times or the described operations may be distributed in a system which allows the occurrence of the processing operations at various intervals associated with the processing.

Various units, circuits, or other components may be described or claimed as "configured to" or "configurable to" perform a task or tasks. In such contexts, the phrase "configured to" or "configurable to" is used to connote structure by indicating that the units/circuits/components include structure (e.g., circuitry) that performs the task or tasks during operation. As such, the unit/circuit/component can be said to be configured to perform the task, or configurable to perform the task, even when the specified unit/circuit/component is not currently operational (e.g., is not on). The units/circuits/components used with the "configured to" or "configurable to" language include hardware—for example, circuits, memory storing program instructions executable to implement the operation, etc. Reciting that a unit/circuit/component is "configured to" perform one or more tasks, or is "configurable to" perform one or more tasks, is expressly intended not to invoke 35 U.S.C. 112, sixth paragraph, for that unit/circuit/component. Additionally, "configured to" or "configurable to" can include generic structure (e.g., generic circuitry) that is manipulated by software and/or firmware (e.g., an FPGA or a general-purpose processor executing software) to operate in manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks. "Configurable to" is expressly intended not to apply to blank media, an unprogrammed processor or unprogrammed generic computer, or an unprogrammed programmable logic device, programmable gate array, or other unprogrammed device, unless accompanied by programmed media that confers the ability to the unprogrammed device to be configured to perform the disclosed function(s).

The foregoing description, for the purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the embodiments and its practical applications, to thereby enable others skilled in the art to best utilize the embodiments and various modifications as may be suited to the particular use contemplated. Accordingly, the present embodiments are to be considered as illustrative and not restrictive, and the invention is not to be limited to the details given herein, but may be modified within the scope and equivalents of the appended claims.

What is claimed is:

1. A method comprising:
   initiating, by a device manager associated with a cluster manager proxy, a connection with a cluster of computing devices, wherein initiating the connection comprises providing first credentials to the cluster of computing devices to access the cluster manager proxy;
   receiving, at a processing device executing the cluster manager proxy, a first request to register the cluster of computing devices with a cluster manager, the first request comprising the first credentials to access the cluster manager proxy and information associated with the cluster, the information comprising registration information of the cluster to allow for workload management by the cluster manager upon registration of the cluster;
   retrieving, by the cluster manager proxy, second credentials associated with access of the cluster manager;
   storing, by the cluster manager proxy, the second credentials;
   generating, by the cluster manager proxy, a second request to register the cluster of computing devices with the cluster manager, the second request comprising the second credentials and the information associated with the cluster; and
   sending, from the processing device executing the cluster manager proxy to the cluster manager, the second request to register the cluster of computing devices with the cluster manager, based on the information associated with the cluster included in the second request.

2. The method of claim 1, further comprising:
   receiving, by the cluster manager proxy, one or more workload instructions from the cluster manager; and
   forwarding, by the cluster manager proxy, the one or more workload instructions to the cluster of computing devices.

3. The method of claim 2, wherein forwarding the one or more workload instructions to the cluster of computing devices comprises:
   translating, by the cluster manager proxy, a destination address of the one or more workload instructions from the cluster manager proxy to the cluster of computing devices and a source address of the one or more workload instructions from the cluster manager to the cluster manager proxy.

4. The method of claim 1, wherein the cluster of computing devices does not have access to the second credentials.

5. The method of claim 1, wherein initiating the connection to the cluster of computing devices comprises:
   bootstrapping the cluster of computing devices to communicate with the cluster manager proxy.

6. The method of claim 5, further comprising:
   in response to receiving the first request to register the cluster of computing devices with the cluster manager, authenticating that the cluster of computing devices has been bootstrapped by the device manager.

7. The method of claim 1, wherein the cluster of computing devices is an edge computing cluster.

8. A system comprising:
a memory; and
a processing device operatively coupled to the memory, the processing device to:
- initiate, by a device manager associated with a cluster manager proxy, a connection with a cluster of computing devices, wherein initiating the connection comprises providing first credentials to the cluster of computing devices to access the cluster manager proxy;
- receive, at the cluster manager proxy, a first request to register the cluster of computing devices with a cluster manager, the first request comprising the first credentials to access the cluster manager proxy and information associated with the cluster, the information comprising registration information of the cluster to allow for workload management by the cluster manager upon registration of the cluster;
- retrieve, by the cluster manager proxy, second credentials associated with access of the cluster manager
- store, by the cluster manager proxy, the second credentials;
- generate, by the cluster manager proxy, a second request to register the cluster of computing devices with the cluster manager, the second request comprising the second credentials and the information associated with the cluster; and
- send, by the cluster manager proxy to the cluster manager, the second request to register the cluster of computing devices with the cluster manager, based on the information associated with the cluster included in the second request.

9. The system of claim 8, wherein the processing device is further to:
- receive, by the cluster manager proxy, one or more workload instructions from the cluster manager; and
- forward, by the cluster manager proxy, the one or more workload instructions to the cluster of computing devices.

10. The system of claim 9, wherein to forward the one or more workload instructions to the cluster of computing devices, the processing device is to:
- translate, by the cluster manager proxy, a destination address of the one or more workload instructions from the cluster manager proxy to the cluster of computing devices and a source address of the one or more workload instructions from the cluster manager to the cluster manager proxy.

11. The system of claim 8, wherein the cluster of computing devices does not have access to the second credentials.

12. The system of claim 8, wherein to initiate the connection to the cluster of computing devices, the processing device is to:
- bootstrap the cluster of computing devices to communicate with the cluster manager proxy.

13. The system of claim 12, wherein the processing device is to:
- in response to receiving the first request to register the cluster of computing devices with the cluster manager, authenticate that the cluster of computing devices has been bootstrapped by the device manager.

14. The system of claim 8, wherein the cluster of computing devices is an edge computing cluster.

15. A non-transitory computer-readable storage medium including instructions that, when executed by a processing device, cause the processing device to:
- initiate, by a device manager associated with a cluster manager proxy, a connection with a cluster of computing devices, wherein initiating the connection comprises providing first credentials to the cluster of computing devices to access the cluster manager proxy;
- receive, by the processing device executing the cluster manager proxy, a first request to register the cluster of computing devices with a cluster manager, the first request comprising the first credentials to access the cluster manager proxy and information associated with the cluster, the information comprising registration information of the cluster to allow for workload management by the cluster manager upon registration of the cluster;
- retrieve, by the cluster manager proxy, second credentials associated with the cluster manager;
- store, by the cluster manager proxy, the second credentials;
- generate, by the cluster manager proxy, a second request to register the cluster of computing devices with the cluster manager, the second request comprising the second credentials and the information associated with the cluster; and
- send, from the processing device executing the cluster manager proxy to the cluster manager, the second request to register the cluster of computing devices with the cluster manager, based on the information associated with the cluster included in the second request.

16. The non-transitory computer-readable storage medium of claim 15, wherein the processing device is further to:
- receive, by the cluster manager proxy, one or more workload instructions from the cluster manager; and
- forward, by the cluster manager proxy, the one or more workload instructions to the cluster of computing devices.

17. The non-transitory computer-readable storage medium of claim 16, wherein to forward the one or more workload instructions to the cluster of computing devices, the processing device is to:
- translate, by the cluster manager proxy, a destination address of the one or more workload instructions from the cluster manager proxy to the cluster of computing devices and a source address of the one or more workload instructions from the cluster manager to the cluster manager proxy.

18. The non-transitory computer-readable storage medium of claim 15, wherein the cluster of computing devices does not have access to the second credentials.

19. The non-transitory computer-readable storage medium of claim 15, wherein to initiate the connection to the cluster of computing devices, the processing device is to:
- bootstrap the cluster of computing devices to communicate with the cluster manager proxy.

20. The non-transitory computer-readable storage medium of claim 19, wherein the processing device is to:
- in response to receiving the first request to register the cluster of computing devices with the cluster manager, authenticate that the cluster of computing devices has been bootstrapped by the device manager.

* * * * *